United States Patent
McSparran

[11] 3,805,144
[45] Apr. 16, 1974

[54] ARRANGEMENT FOR INHIBITING UNDERSIRABLE REVERSE FIELD CURRENTS IN EXCITATION SYSTEMS OF TRACTION VEHICLE POWER SUPPLIES

[75] Inventor: Lloyd W. McSparran, Erie, Pa.
[73] Assignee: General Electric Company, Erie, Pa.
[22] Filed: Apr. 16, 1973
[21] Appl. No.: 351,807

[52] U.S. Cl................. 322/25, 317/13 R, 322/79, 322/98
[51] Int. Cl. ............................................. H02h 7/06
[58] Field of Search ................ 322/25, 79, 98, 91; 317/13 R

[56] References Cited
UNITED STATES PATENTS

| | | | |
|---|---|---|---|
| 2,886,763 | 5/1959 | Zelina | 322/25 |
| 2,983,861 | 5/1961 | Hysler | 322/79 X |
| 3,105,186 | 9/1963 | Zelina | 322/36 |
| 3,621,370 | 11/1971 | Vandervort | 322/23 |

*Primary Examiner*—James D. Trammell
*Attorney, Agent, or Firm*—Walter C. Bernkopf; Dana F. Bigelow

[57] ABSTRACT

In electric traction vehicles, such as diesel locomotives, a prime mover drives an alternator and d-c excitation generator system whose output power is applied to traction motors. The alternator output is conventionally regulated by a control signal applied to a first shunt winding of the exciter generator and the exciter armature output is connected in series circuit with the alternator field. Under some conditions, such as dynamic braking, the alternator output must be reduced to very low levels. This requires reversal of the control signal polarity, because of the residual flux in the d-c exciter, and may result in undesirably large reverse currents in the alternator field. Such undesired reverse currents are inhibited by connecting a low power diode in series circuit with the exciter armature circuit and a low impedance second winding of the exciter, such as the cranking winding. The diode is poled so as to conduct when there are reverse currents in the exciter armature and alternator field circuit and the second winding is connected in respect to the first winding, such that the flux of the first winding opposes that of the first winding.

4 Claims, 1 Drawing Figure

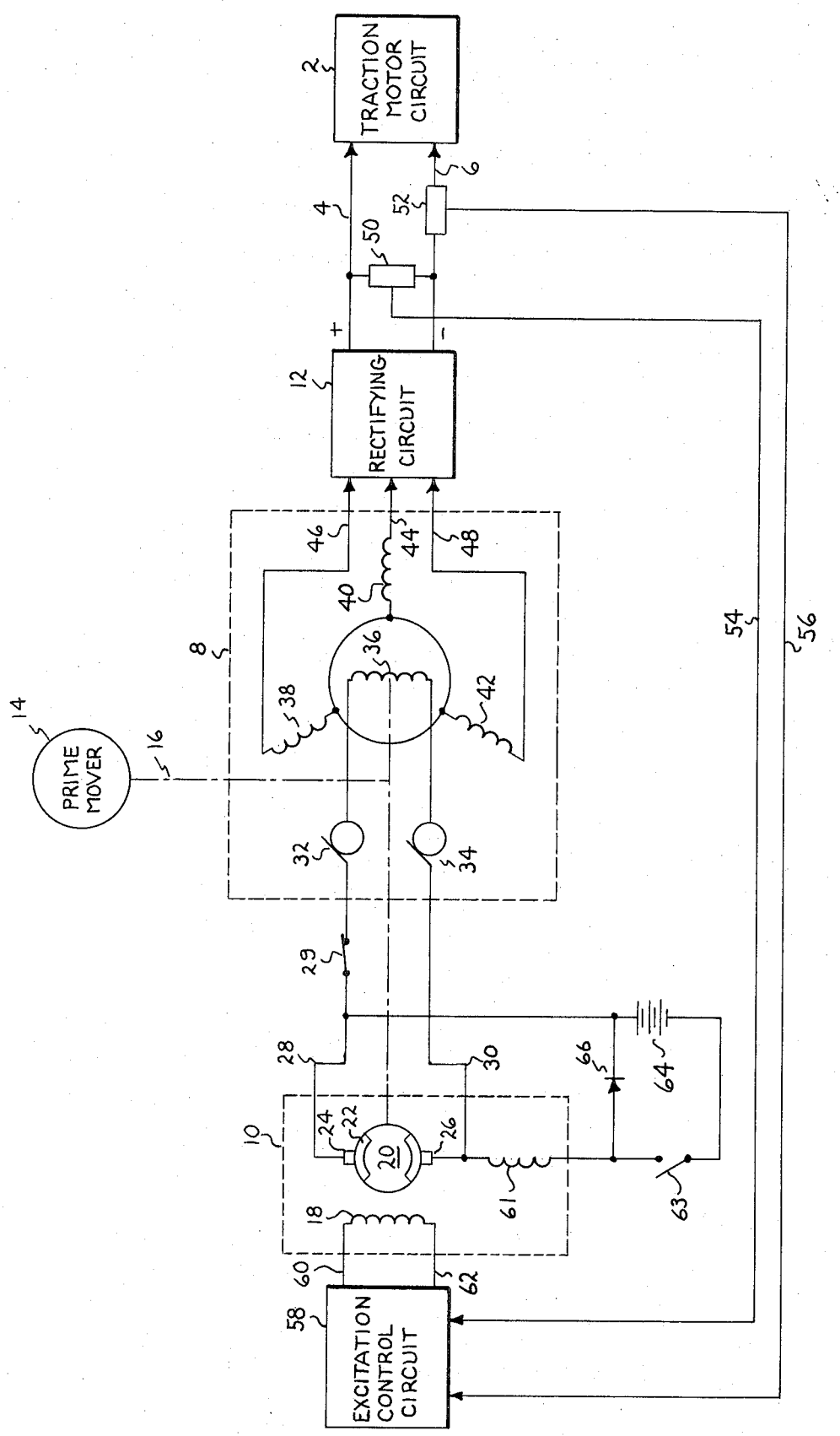

ARRANGEMENT FOR INHIBITING UNDERSIRABLE REVERSE FIELD CURRENTS IN EXCITATION SYSTEMS OF TRACTION VEHICLE POWER SUPPLIES

BACKGROUND OF THE INVENTION

This invention relates to electric propulsion systems for traction vehicles, and in particular to excitation control circuits of alternators providing power to traction motors.

In diesel electric locomotives, and other types of electrically propelled traction vehicles, a prime mover, such as a diesel engine, drives electric generating means which in turn energize direct current traction motors. Alternators are commonly used as generating means to overcome commutation problems associated with d-c generating equipment and the alternator output is rectified prior to application to the d-c traction motors. Rotary d-c exciting geneating means are associated with the alternator to control the output of the alternator and, additionally, may be utilized as a cranking motor to start the prime mover.

Propulsion control is effected by modifying the alternator output in response to a control signal. The control signal is applied to an exciter field winding of the exciting generating means. The latter, acting as a rotational amplifier, provides its unidirectional power output from its brush terminals to field windings of the alternator. The rectified output of the alternator thus varies in magnitude as a function of the control signal which is applied to the field of the exciting means. A feedback type of excitation control system senses the rectified power output of the alternator and the demanded power output, such as indicated by the position of a vehicle control lever, so as to produce the appropriate control signal. Traction vehicle propulsion control systems of this type are disclosed in U.S. Pat. Nos. 2,886,763 — Zelina, 3,105,186 — Zelina, and 3,621,370 — Vandervort, which are assigned to the assignee of this application.

Proper operation of the traction motors requires substantial variations in the output of the alternator. For example, in conventional diesel electric locomotives, the alternator output must be varied in excess of 1,000 volts and 1,000 amps. Occasionally the alternator output must be reduced to very low levels. For example, during dynamic braking the traction motors are commonly operated as separately excited generators with the motor fields being energized by the rectified alternator output. The generated power output of the traction motors must be limited so as not to exceed the maximum power handling capacity of the braking resistors. The generated output power of the traction motors is a direct function of the motor field excitation of the rotational speed of the motor armature. Therefore dynamic braking at high vehicle speeds and thus at high armature rotational speeds requires that motor field excitation and thus the alternator output be reduced to very low voltage levels.

Reduction of the alternator output is accomplished by reducing field excitation of the d-c exciting generating means. However, the alternator may still provide a substantial and excessive output where there is zero field current in the exciter. Accordingly, adequate reduction of alternator output requires that the exciter field current be reversed. The normal polarity of the control signal applied to the exciter field must be reversed.

A reversal of exciter field current can, however, cause a reversal in polarity at the exciter brush terminals and, therefore, a reversal of the unidirectional current flowing in the alternator field winding. Because of the high grain of the d-c exciter and alternator system, a negative control signal of even very small amplitude can produce an excessive alternator output.

Under normal conditions an excessive alternator output is immediately corrected. The propulsion control system senses the rectified output of the alternator, causes the average control signal to decrease so as to reduce the exciter field current and the alternator output. However, if the alternator output is excessive during the brief interval when the control signal polarity is reversed, e.g. the control signal is negative instead of positive, the control system may cause the control signal to increase in the reverse direction, e.g. the control signal becomes even more negative, so as to increase, instead of decrease, the alternator output. Instability of the control system under thes conditions can result in excessive alternator outputs so as to damage equipment, such as dynamic braking resistors.

A prior art corrective arrangement utilizes a complex feedback circuit from the alternator field circuit to a pulse width modulation circuit in the control system. Transients appearing in the alternator field circuit cause a low voltage signal to be applied to the modulation circuit in opposition to the normal correction signals. However, this arrangement is not wholly successful in correcting the above described condition.

Accordingly, it is an object of this invention to provide an improved circuit for precluding erroneous alternator outputs in a traction vehicle propulsion system.

It is a further object to provide an inexpensive and simple circuit arrangement for inhibiting undesirable current reversal in the exciter armature and alternator field circuit.

SUMMARY OF THE INVENTION

Briefly stated in accordance to one aspect of the invention in a traction vehicle propulsion arrangement wherein an alternator and associated d-c exciter generating means are adapted to be driven by a prime mover, the d-c exciter generating means has its first and second brush terminals coupled in series circuit with a field winding of the alternator. A first winding of the d-c exciter generating means is adapted to be energized by a control signal whereby the first and second brush terminals respectively exhibit predetermined polarities and provide a unilateral current flow of predetermined direction through said alternator field windings. Unilateral conducting means are coupled in series circuit with said first and second brush output terminals and a second winding of the d-c exciter generating means. The unilateral conducting means are poled to cause conduction upon reversal of the normally exhibited polarities on said first and second brush terminals and said second winding is connected in respect to the first to inhibit erroneous excitation of the d-c exciter generating means. The second winding may additionally be connected in series circuit with a contactor and current source to provide for use of the d-c generating means as a cranking motor for the prime mover.

BRIEF DESCRIPTION OF THE DRAWING

The drawing is a simplified schematic circuit diagram of the control system in accordance to one embodiment of the invention.

DESCRIPTION OF THE PREFERRED EMBODIMENT

Reference is made to the drawing. A traction motor circuit 2 is supplied with unidirectional power from a rectifying circuit 12 over lines 4 and 6. This power is supplied by an alternating current generating system, including a d-c excitation generator 10 and an alternator 8 whose alternating current output is supplied to rectifying circuit 12. The d-c exciting generator supplies the d-c current required to maintain the a-c generator field. The alternator and d-c exciting generator are driven by a prime mover 14, preferably a diesel engine, as schematically illustrated by dashed line 16.

The exciting generator has an exciter shunt field winding 18. Exciter field current creates a magnetic flux between the field winding. An armature 20 is rotated in the exciter field flux so that voltage is induced in the armature windings. The exciter commutator 22 cooperates with brushes so that first brush terminal 24 and second brush terminal 26 each normally exhibit predetermined voltage polarities.

The alternator is preferably of the revolving field type. The output of the d-c exciting generating means is coupled from terminals 24 and 26, respectively by lines 28 and 30 through slip rings 32 and 34 to field windings 36 on the rotor of the alternator. Switch 29, in line 28, is closed during operation of the alternator system. The resulting field cuts the armature windings in the stator of the machine to induce alternating voltages therein.

The preferred embodiment incorporates three phase stator windings 38, 40, 42 whose outputs are connected by lines 44, 46, and 48 to the input of the rectifying circuit 12.

The preferred embodiment utilizes a multi pole, three phase salient pole alternator, the slip ring end of whose rotor is supported by bearings mounted in the alternator framehead. The other end of the rotor is directly connected to a diesel engine through a coupling. The stator frame may be bolted to the frame of the diesel engine frame. The d-c exciting generator may be a discrete assembly bolted to the outboard end of the alternator with its rotor coupled through a gear box. Alternate types of alternators, drive and structural arrangements may, of course, be utilized.

Prime movers require external starting, i.e. cranking, means. D-C series motors are generally utilized for this purpose in order to provide the high torque required for engine starting. Alternators of the type described cannot be employed as a cranking motor. Therefore, the d-c exciting generating means is commonly used for this purpose. For this purpose the exciting generator of the preferred embodiment incorporates a second winding 61, one end of which is connected to brush terminal 26 and its other end is connected in a series circuit with cranking contactor 63 and a current source 64, such as a battery, to brush terminal 24. The prime mover may be cranked with switch 29 open, by closure of the cranking contactor 63. This excites winding 61 and causes the d-c exciting generating means to rotate and start the prime mover.

During normal operation of the generating system, the output of the rectifying circuit is properly maintained by an excitation control circuit. The preferred embodiment utilizes an excitation control circuit of the type disclosed in the referenced U.S. Pat. No. 2,886,763 — Zelina. The power output of the rectifying circuit is detected by a voltage sensor 50 and a current sensor 52 whose outputs are applied by lines 54 and 56 to the excitation control circuit 58 whose output is applied by lines 60 and 62 to exciter shunt field winding 18. Other forms of regulating circuits may be utilized. Variation of the control signal on lines 60 and 62 varies field excitation and thus the voltage at the brush terminals 24 and 26. A unidirectional current varying as a function of the control signal amplitude thus flows in the series circuit comprising lines 28, 30, slip rings 32, 34 and alternator field winding 36.

During normal operation, the control signal on lines 60 and 62 has a predetermined polarity, such that, for example, line 60 is positive in respect to line 62. Similarly the voltage at the brush terminals 24 and 26 is of predetermined polarity, such that, for example, brush terminal 24 is positive in respect to brush terminal 26. However, as described in the introductory paragraphs, reducing the alternator output to low levels occasionally requires a reversal of the shunt field current of the d-c exciting generating means, and thus a reversal of the polarity of the control signal. Under these conditions it is possible to have a reversal of polarities on brush terminals 24 and 26 and thus a reversal of the field current in the alternator. As previously described the regulation circuit may be ineffective under these conditions so as to result in excessive power outputs of the rectifying circuit.

In order to prevent this phenomena, unilaterally conducting means 66, such as a diode, is connected from brush terminal 24 to the junction of second winding 61 and cranking contactor 63. Diode 66 is poled such that conduction can occur only upon an undesired reversal of polarity on brush terminals 24 and 26. Accordingly during polarity reversals of the brush terminals, i.e. for example, terminal 24 being negative in respect to terminal 26, current flows from brush terminal 24 through diode 66 and winding 61 to brush terminal 26. Winding 61 is connected differentially in respect to excitation winding 18 such that flux produced by winding 61 opposes the flux produced by the excitation winding 18 when the excitation shunt field and the exciter armature currents are both reversed. This arrangement clamps the reverse polarity voltage at brush terminal 24 but additionally reduces the excitation flux in the d-c exciter generating means, since the flux of winding 61 opposes the flux field of excitation winding 18. Therefore reversed unidirectional current flow through the alternator field winding is effectively inhibited.

The series field winding 61, designed for cranking purposes, conventionally has only a few turns and therefore has a low resistance. For example, in the preferred embodiment winding 61 has between 5 and 10 turns, as compared to some 200 to 400 turns of the shunt winding. Accordingly the maximum reverse polarity attainable on brush terminals 24 and 26 is very low, being limited during conduction of device 66 to approximately the sum of the forward voltage drop across device 66 and the IR drop across winding 61. In the case of the preferred embodiment this drop is approximately one volt.

It is significant that this combined feedback and clamping arrangement results in only a low current flow through the unilaterally conducting device 66. For example, in the preferred embodiment the typical value of diode current is approximately 6 amps. By comparison, the maximum alternator field current in the preferred embodiment is approximately 300 amperes. Accordingly, the inventive arrangement permits utilization of unilaterally conducting devices having substantially lower current carrying capacity, than would otherwise be required, and results in an effective but extremely inexpensive arrangement to inhibit undesirable reverse current flow through the alternator field winding.

Various changes, modifications and substitutions may be made in the embodiment described herein without departing from the true scope and spirit of the invention as defined in the appended claims.

What I claim as new and desire to secure by letters Patent of the United States is:

1. In a propulsion system for traction vehicles wherein the rectified power output of prime mover driven alternator means is applied to d-c traction motors and the output power of said alternator means is controlled by a control signal amplified by rotating d-c exciter generating means to excite field windings of said alternator means, said d-c exciter generating means comprising shunt field windings, an armature, first and second brush output terminals, means coupling said control signal to said shunt field windings, said alternator means comprising alternator field windings and output windings, said first and second brush output terminals being coupled in a first series circuit with said alternator field windings, said first and second brush terminals normally each exhibiting predetermined polarities to provide a unilateral current flow of predetermined direction through said alternator field windings, an arrangement for inhibiting reversed unidirectional current flow through said alternator field winding comprising:
   a. unidirectional conducting means,
   b. second windings on said d-c excitation generating means,
   c. means coupling said unidirectional coupling means in a second series circuit with said second windings to said first and second brush output terminals,
   d. said unidirectional conducting means being poled to cause conduction upon reversal of the normally exhibited polarities on said first and second brush terminals,
   e. said second windings being connected in respect to said shunt field windings so that the flux fields produced by said shunt field and second windings are in opposition upon polarity reversal of said control signal and conduction of said unilaterally conducting means.

2. In an arrangement wherein said d-c exciter generating means is utilized as a cranking motor for the prime mover, the combination of claim 1 wherein said second windings, a cranking contactor and a source of unidirectional current are connected in an additional series circuit with said first and second brush terminals.

3. In a prime mover driven d-c excitation generating means and revolving field alternator system, wherein the d-c excitation generating means comprises a shunt field winding adapted to be excited by a control signal current, and first and second brush terminals, said terminals being connected in a first series circuit with the alternator field windings, said first and second brush terminals normally each exhibiting a predetermined polarity so as to provide a unilateral current flow of predetermined direction through said alternator field windings, the combination for preventing excessive current flow of reversed direction through said alternator field windings resulting from a reversal of control signal current, through said shunt field windings, comprising:
   a. second windings of said d-c generating means, and unilaterally conducting means connected in a second series circuit to said first and second brush terminals,
   b. said unilaterally conducting means being poled for conduction upon a reversal of polarities on said first and second brush terminals, said second circuit exhibiting a low resistance upon such conduction to satisfactorily limit the voltage output of said first and second brush terminals,
   c. said second windings being connected in respect to said shunt field winding such that during conduction of said unilaterally conducting means the flux fields produced by said first and second field windings are in opposition.

4. The combination of claim 3 wherein the d-c excitation generating means is additionally adapted to be used as a cranking motor for said prime mover, and said second winding is connected in series circuit with a cranking contactor and a unilateral current source to said first and second brush terminals.

* * * * *